United States Patent
Kim et al.

(10) Patent No.: US 11,133,131 B2
(45) Date of Patent: Sep. 28, 2021

(54) MULTILAYER CERAMIC ELECTRONIC COMPONENT

(71) Applicant: SAMSUNG ELECTRO-MECHANICS CO., LTD., Suwon-si (KR)

(72) Inventors: Hwi Dae Kim, Suwon-si (KR); Young Jun Cha, Suwon-si (KR); Woo Chul Shin, Suwon-si (KR); Chan Yoon, Suwon-si (KR); Tae Hyeok Kim, Suwon-si (KR); Sang Soo Park, Suwon-si (KR); Ji Hong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 66 days.

(21) Appl. No.: 16/774,711

(22) Filed: Jan. 28, 2020

(65) Prior Publication Data
US 2020/0411237 A1    Dec. 31, 2020

(30) Foreign Application Priority Data
Jun. 26, 2019   (KR) .................. 10-2019-0076144

(51) Int. Cl.
*H01G 4/012*     (2006.01)
*H01G 4/30*      (2006.01)
*H01G 4/232*     (2006.01)

(52) U.S. Cl.
CPC .......... *H01G 4/012* (2013.01); *H01G 4/2325* (2013.01); *H01G 4/30* (2013.01)

(58) Field of Classification Search
CPC ........... H01G 4/12; H01G 2/065; H01G 2/24; H01G 4/0085; H01G 4/012; H01G 4/20;
(Continued)

(56) References Cited

U.S. PATENT DOCUMENTS

2009/0154055 A1   6/2009  Takashima et al.
2012/0073129 A1*  3/2012  Abe ................. H01G 4/232
                                                    29/825
(Continued)

FOREIGN PATENT DOCUMENTS

JP      H08-97070 A        4/1996
JP      2009-170873 A      7/2009
KR    10-2014-0085097 A    7/2014

*Primary Examiner* — Michael P McFadden
(74) *Attorney, Agent, or Firm* — Morgan, Lewis & Bockius LLP

(57) ABSTRACT

A multilayer ceramic electronic component includes a ceramic body comprising dielectric layers and first and second internal electrodes disposed to face each other with respective dielectric layers interposed therebetween. The first internal electrode comprises a body portion contributing to the capacitance generation and a lead-out portion having a narrower width than the body portion and an end exposed from a surface, and the second internal electrode comprises a body portion contributing to the capacitance generation and a lead-out portion having a narrower width than the body portion and an end exposed from another surface. A ratio (w2/w1) of a width (w2) of the lead-out portion of the first and second internal electrodes to a width (w1) of the body portion satisfies $0.3 \leq w2/w1 \leq 0.5$.

24 Claims, 6 Drawing Sheets

(58) Field of Classification Search
CPC ........ H01G 4/2325; H01G 4/30; H01G 4/306;
H01G 4/33
See application file for complete search history.

(56) References Cited

U.S. PATENT DOCUMENTS

| | | | |
|---|---|---|---|
| 2014/0185189 A1 | 7/2014 | Kim et al. | |
| 2014/0367152 A1* | 12/2014 | Lee | H05K 1/111 |
| | | | 174/260 |
| 2015/0060122 A1* | 3/2015 | Lee | H01G 4/30 |
| | | | 174/260 |
| 2017/0345571 A1* | 11/2017 | Imaeda | H01G 4/248 |
| 2018/0042113 A1* | 2/2018 | Park | H01G 2/065 |
| 2019/0318872 A1* | 10/2019 | Mizuno | H01G 4/224 |

* cited by examiner

I-I'

MULTILAYER CERAMIC ELECTRONIC COMPONENT

CROSS-REFERENCE TO RELATED APPLICATION(S)

This application claims benefit of priority to Korean Patent Application No. 10-2019-0076144 filed on Jun. 26, 2019 in the Korean Intellectual Property Office, the disclosure of which is incorporated herein by reference in its entirety.

TECHNICAL FIELD

The present disclosure relates to a multilayer ceramic electronic component, and more specifically, to a multilayer ceramic electronic component having excellent reliability.

BACKGROUND

Due to a recent trend that mounting density of a substrate is growing higher, there a need for reduction in a mounting area of the multilayer ceramic capacitors. Additionally, there is a growing demand for products embedded in the substrate or mounted in an LSC type by reducing a thickness thereof.

In such case, not only the mounting area is reduced but also an ESL generated in the substrate is reduced. Accordingly, there is a growing demand for thin multilayer ceramic capacitors.

However, thin multilayer ceramic capacitors have low moisture-resistance reliability.

Conventionally, a pattern in which a width of lead-out portions, which are regions exposed to an outside of a ceramic body, are smaller than those of body portions contributing to capacity generation was applied to the internal electrodes in order to prevent such deterioration of moisture-resistance reliability.

However, if the width of the lead-out portion exposed to the outside of the ceramic body is much smaller than that of the body portion contributing to capacity generation in order to prevent the deterioration of moisture-resistance reliability, there are side effects of increased equivalent series resistance (ESR) and equivalent series inductance (ESL).

Accordingly, there is a need to determine a ratio of width of the lead-out portion to the body portion contributing to the capacitance generation in the first and second internal electrodes so that low ESR and ESL can be secured and reliability is improved.

SUMMARY

An aspect of the present disclosure is to provide a multilayer ceramic electronic component, more specifically, to a multilayer ceramic electronic component having excellent reliability.

According to an aspect of the present disclosure, a multilayer ceramic electronic component includes a ceramic body comprising dielectric layers and first and second internal electrodes facing each other with respective dielectric layers interposed therebetween, and a first surface and a second surface opposing each other in a thickness direction of the ceramic body along which the dielectric layers are stacked, a third surface and a fourth surface connected to the first and second surfaces and opposing each other, and a fifth surface and a sixth surface connected to the first to fourth surfaces and opposing each other. A first external electrode and a second external electrode are disposed on the fifth and sixth surfaces of the ceramic body, respectively, where the first external electrode is connected to the first internal electrode and the second external electrode is electrically connected to the second internal electrode. The ceramic body comprises an active portion generating capacitance by comprising the first and second internal electrodes disposed to face each other with respective dielectric layers interposed therebetween, and cover portions disposed in an upper part and a lower part of the active portion. The first internal electrode comprises a body portion contributing to the capacitance generation and a lead-out portion having a narrower width than the body portion and an end exposed from the fifth surface, and the second internal electrode comprises a body portion contributing to the capacitance generation and a lead-out portion having a narrower width than the body portion of the second internal electrode and an end exposed from the sixth surface. A ratio (w2/w1) of a width (w2) of the lead-out portion of the first and second internal electrodes to a width (w1) of the body portion satisfies $0.3 \leq w2/w1 \leq 0.5$.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
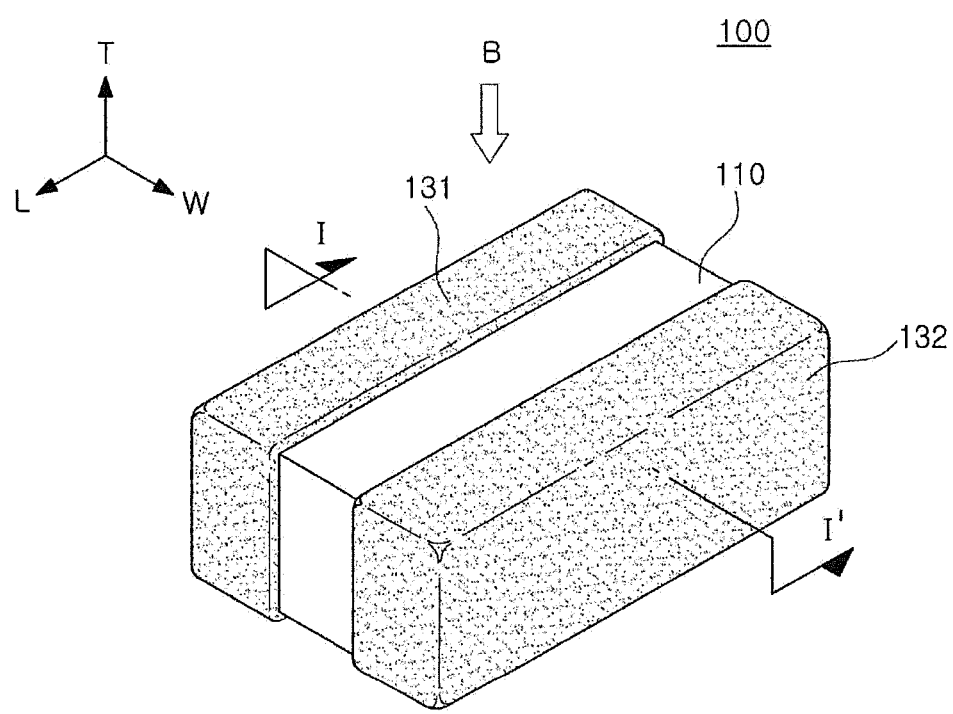
FIG. 1 is a schematic perspective view of a multilayer ceramic capacitor according to an embodiment in the present disclosure.

The invention may be embodied in many different forms and should not be construed as being limited to the embodiments set forth herein. Rather, these embodiments are provided so that this disclosure will be thorough and complete, and will fully convey the scope of the invention to those skilled in the art. Accordingly, the shapes and dimensions of elements in the drawings may be exaggerated for clarity, and the same reference numerals will be used throughout to designate the same or like elements.

In the specification, unless otherwise specifically indicated, when a certain part "includes" a certain component, it is understood that other components may be further included but are not excluded.

In the drawings, anything unnecessary for describing the present disclosure will be omitted for clarity, and thicknesses are enlarged for the purpose of clearly illustrating layers and areas. Like reference numerals in the drawings denote like elements, and thus their descriptions will be omitted.

Hereinafter, preferred embodiments of the present disclosure will be described as follows with reference to the attached drawings.

FIG. 1 is a schematic perspective view of a multilayer ceramic capacitor according to an embodiment in the present disclosure.

Figure 2:
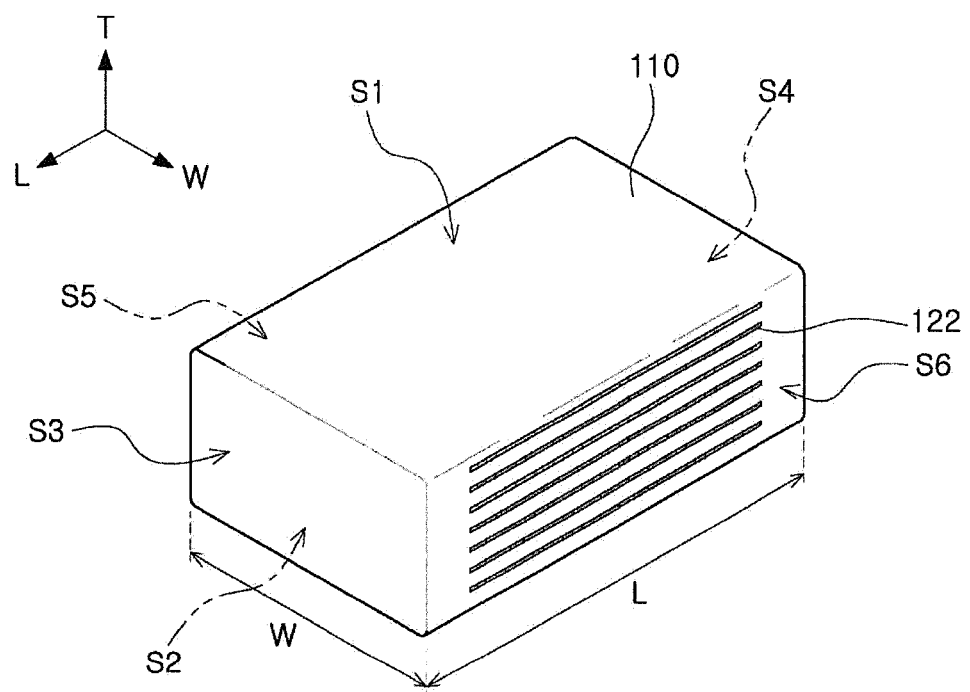
FIG. 2 is a schematic diagram of a ceramic body according to an embodiment.

FIG. 2 is a schematic diagram of a ceramic body according to an embodiment.

Figure 3:
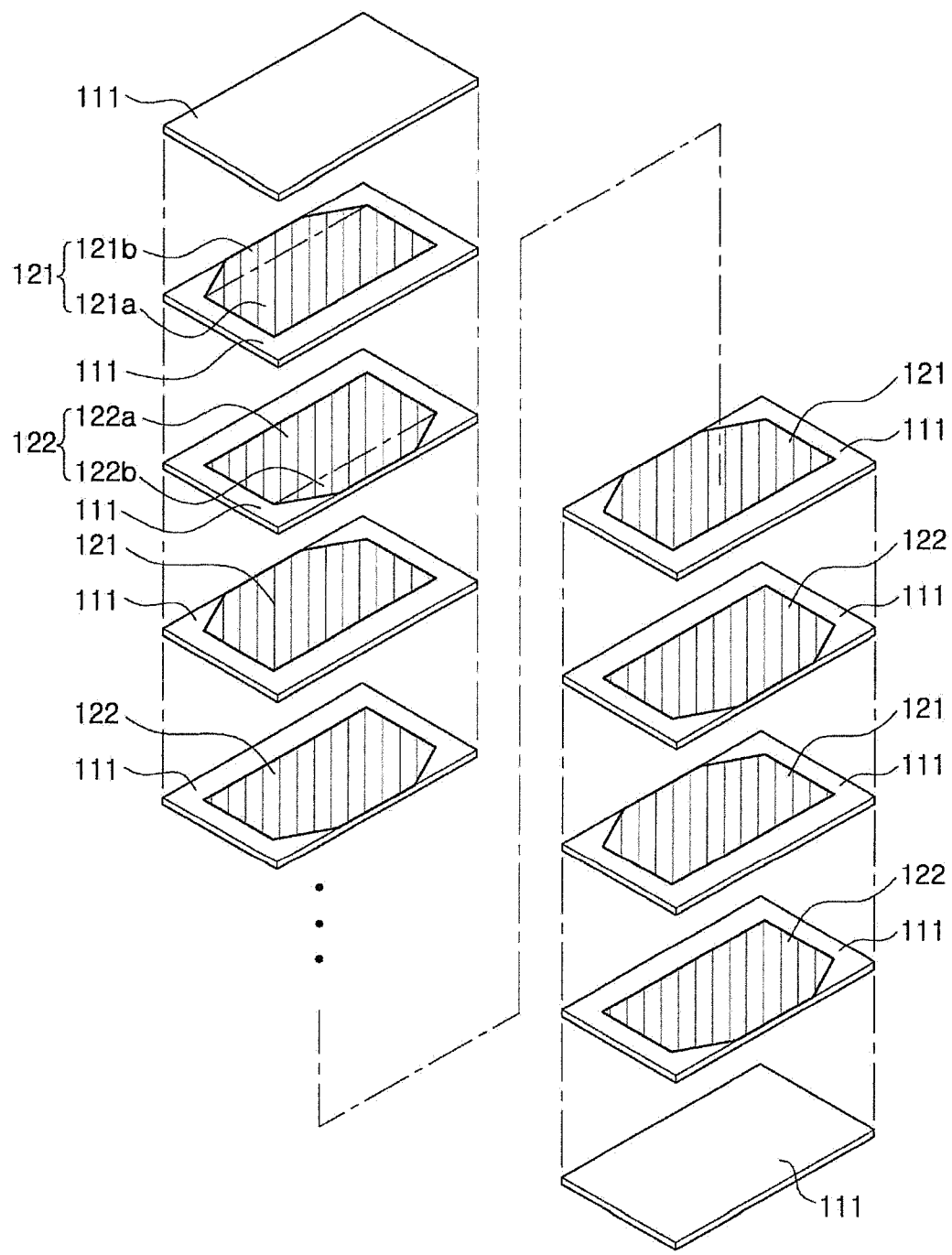
FIG. 3 is a disassembled perspective view of FIG. 2.

FIG. 3 is a disassembled perspective view of FIG. 2.

Figure 4:
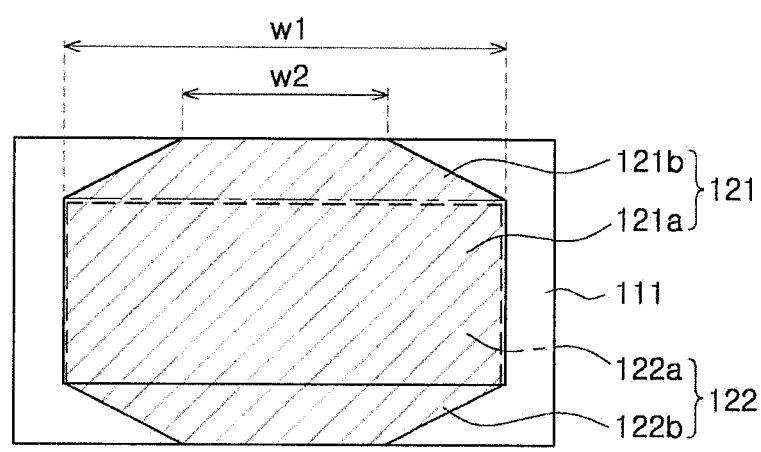
FIG. 4 is a plan view of first internal electrodes and second internal electrodes individually stacked on dielectric layers.

FIG. 4 is a plan view of first internal electrodes and second internal electrodes individually stacked on dielectric layers.

Figure 5:
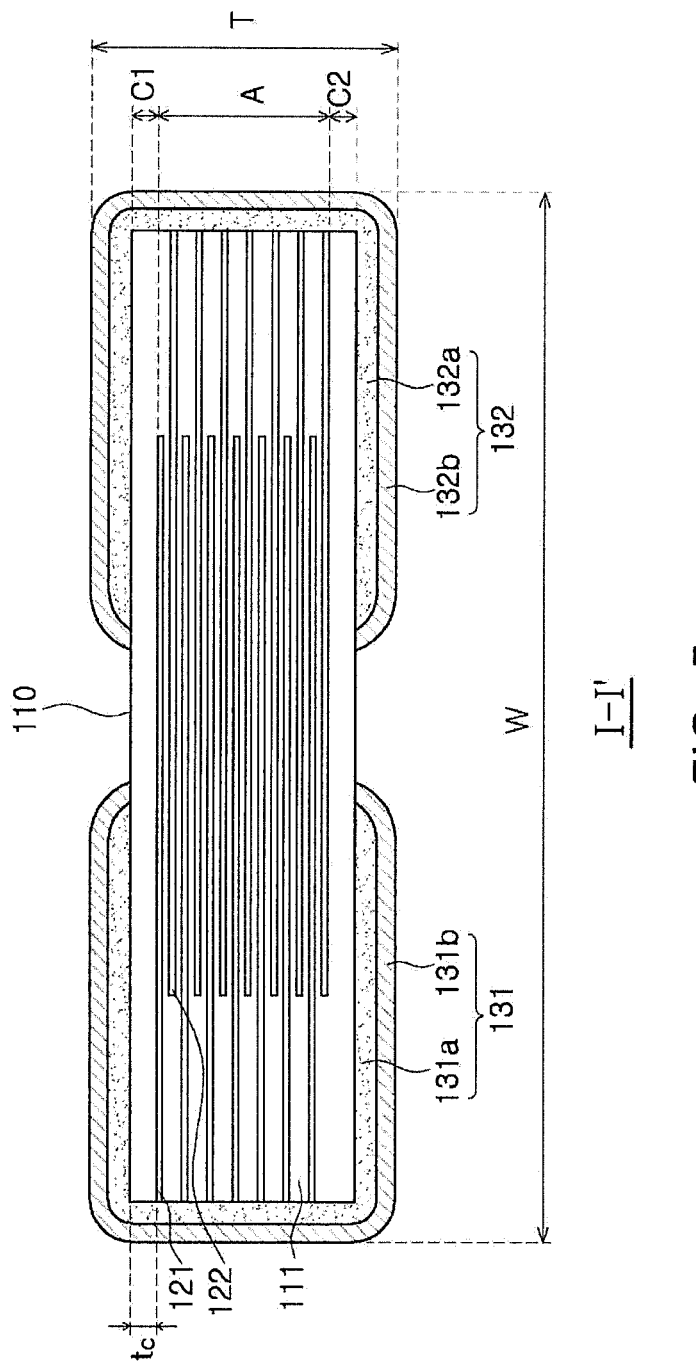
FIG. 5 is a cross-sectional view taken along line I-I' of FIG. 1 according to an embodiment.
Figure 6:
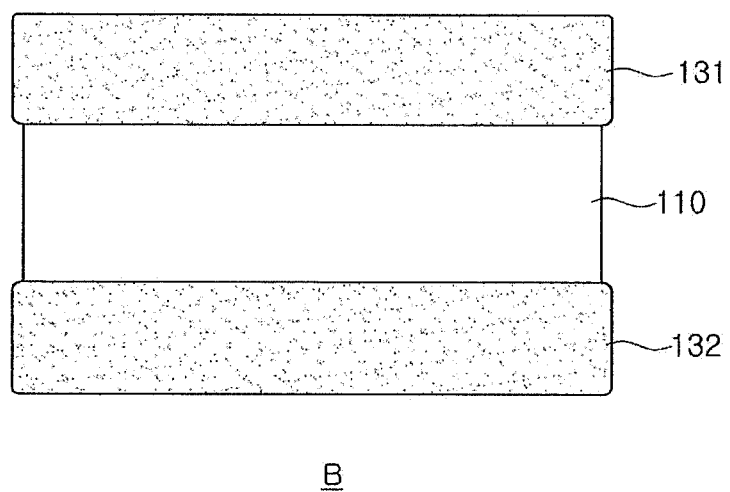
FIG. 6 is a top plan view taken in a B direction of FIG. 1.

FIG. 5 is a cross-sectional view taken along line I-I' of FIG. 1 according to an embodiment; and FIG. 6 is a top plan view taken in a B direction of FIG. 1.

Referring to FIGS. 1 to 6, the multilayer ceramic electronic component according to an embodiment includes a ceramic body 110 comprising dielectric layers 111 and first and second internal electrodes 121 and 122 disposed to face each other with respective dielectric layers 111 interposed therebetween, and a first surface S1 and a second surface S2 opposing each other, a third surface S3 and a fourth surface S4 connected to the first and second surfaces S1 and S2 and opposing each other, and a fifth surface S5 and a sixth surface S6 connected to the first to fourth surfaces and opposing each other; and a first external electrode 131 and a second external electrode 132 disposed on external surfaces of the ceramic body 110, the first external electrode 131 being connected to the first internal electrode 121 and the second external electrode 132 being electrically connected to the second internal electrode 122. The ceramic body 110 comprises an active portion A generating capacitance by comprising the first and second internal electrodes 121 and 122 disposed to face each other with respective dielectric layers 111 interposed therebetween, and cover portions C1 and C2 disposed on an upper part and a lower part of the active portion A.

Hereinbelow, a multilayer ceramic electronic component will be described according to an embodiment, particularly as a multilayer ceramic capacitor, but is not limited thereto.

In regard to the multilayer ceramic capacitor 100 according to an embodiment, the "length direction," "width direction," and "thickness direction" are defined as an "L" direction, a "W" direction, and a "T" direction, respectively. The "thickness direction" may be used in the same sense as a direction in which the dielectric layers are stacked up, for example, a "lamination direction."

In an embodiment, the ceramic body 110 is not particularly limited in terms of configuration, but may be a rectangular cuboid shape as illustrated in the drawing.

The ceramic body 110 may include a first surface S1 and a second surface S2 facing in a first direction, a third surface S3 and a fourth surface S4 connected to the first surface S1 and the second surface S2, and a fifth surface S5 and a sixth surface S6 connected to the first to fourth surfaces and opposing each other.

The first surface S1 and the second surface S2 are surfaces facing in the thickness direction of the ceramic body 110. The third surface S3 and the fourth surface S4 may be defined as surfaces facing in the length direction, while the fifth surface S5 and the sixth surface S6 may be defined as surfaces facing in the width direction.

The ceramic body 110 is not particularly limited in terms of configuration, but may be a rectangular cuboid shape as illustrated in the drawing.

Ends of a plurality of the first and second internal electrodes 121 and 122 formed in the ceramic body 110 are exposed to the fifth surface S5 or the sixth surface S6 of the ceramic body.

The internal electrodes 121 and 122 may be the first internal electrode 121 and the second internal electrode 122 having different polarities in pairs.

One end of the first internal electrode 121 may be exposed to the fifth surface S5, while one end of the second internal electrode 122 may be exposed to the sixth surface S6.

The other end of the first internal electrode 121 is formed in a certain distance from the sixth surface S6.

The other end of the second internal electrode 122 is formed in a certain distance from the fifth surface S5. This will be described in more detail below.

The first external electrode 131 is formed on the fifth surface S5 to be electrically connected to the first internal electrode, while the second external electrode 132 is formed on the sixth surface S6 to be electrically connected to the second internal electrode 122.

A thickness of each of the first and second internal electrodes may be 0.4 µm or less.

According to an embodiment, raw materials forming the dielectric layers 111 are not particularly limited as long as sufficient capacitance, and for example, may be barium titanate ($BaTiO_3$) powder.

As for materials forming the dielectric layers 111, various ceramic additives, organic solvents, plasticizers, binders, dispersants, or the like, can be added to powder of barium titanate, or the like, according to purpose of the present disclosure.

Such ceramic body 110 may include an active portion A as a part contributing to the capacitance generation of the capacitor and an upper cover portion C1 and a lower cover portion C2 respectively disposed on the lower and upper portions of the active portion A as upper and lower margin portions.

The active portion A may be formed by repeatedly stacking the plurality of the first and second internal electrodes 121 and 122 while having the dielectric layer therebetween.

The upper and lower cover portions C1 and C2 may have the same materials and composition as the dielectric layer 111 except that they exclude internal electrodes.

In other words, the upper and lower cover portions C1 and C2 may include ceramic materials, for example, $BaTiO_3$-base ceramic materials.

The upper cover portion C1 and the lower cover portion C2 may be formed by stacking a single dielectric layer or each of at least two dielectric layers on the upper and lower surfaces of the active portion A in a vertical direction. Basically, the upper cover portion C1 and the lower cover portion C2 may prevent damage of internal electrodes due to physical or chemical stress.

Materials forming the first and second internal electrodes 121 and 122 are not particularly limited, but for example, may be a conductive paste including at least one of silver (Ag), lead (Pb), platinum (Pt), nickel (Ni) and copper (Cu).

A multilayer ceramic capacitor according to an embodiment may include a first external electrode 131 electrically connected to the first internal electrode 121 and a second external electrode 132 electrically connected to the second internal electrode 122.

The first and second external electrodes 131 and 132 may be electrically connected to the first and second internal electrodes 121 and 122 to generate capacitance. The second external electrode 132 may be connected to an electric potential different from that of the first external electrode 131.

The first and second internal electrodes 121 and 122 are disposed to face each other with respective dielectric layers 111 interposed therebetween, and may be alternatively exposed to the fifth surface S5 or the sixth surface S6 in the width direction of the ceramic body 110.

By being alternatively exposed to the fifth surface S5 or the sixth surface S6 in the width direction of the ceramic body 110, the first and second internal electrodes 121 and 122, a reverse geometry capacitor (RGC) or a low inductance chip capacitor (LICC) can be implemented.

In other words, the length of the ceramic body 110 is a distance between the third surface S3 and the fourth surface S4, and the width of the ceramic body 110 is a distance between the fifth surface S5 and the sixth surface S6, where the first and second internal electrodes 121 and 122 are alternatively exposed to the fifth and sixth surfaces S5 and S6. The length of the ceramic body 110 may be greater than the width of the ceramic body 110.

Conventional multilayer ceramic electronic components may include external electrodes disposed on cross sections opposing each other in the length direction of the ceramic body.

In this case, when AC is applied to the external electrode, a current path is long, and thus a longer current loop can be formed. Further, due to an increased size of induced magnetic field, inductance may increase as well.

According to an embodiment, in order to solve the problem, the first and second external electrodes 131 and 132 may be disposed on the fifth surface S5 and the sixth surface S6 in the width direction of the ceramic body 110 so as to decrease the length of the current path.

In this case, as a distance between the first and second external electrodes 131 and 132 are small, a current path becomes shorter, which will reduces the length of the current loop, thereby giving rise to reduced inductance.

Referring to FIGS. 3 and 4, as for the multilayer ceramic capacitor according to an embodiment, the internal electrode 121 includes a body portion 121a contributing to capacitance generation and a lead-out portion 121b having a narrower width compared to the body portion 121a and an end exposed to the fifth surface S5. The second internal electrode 122 includes a body portion 122a contributing to capacitance generation and a lead-out portion 122b having a narrower width compared to the body portion 122a and an end exposed to the sixth surface S6. A ratio of the width (w2) of the lead-out portions 121b and 122b to the width (w1) of the body portions 121a and 122a of the first and second internal electrodes 121 and 122 satisfies $0.3 \leq w2/w1 \leq 0.5$. In one example, the width (w2) refers to a width of an edge of the lead-out portions 121b and 122b exposed from the body. In one example, each of the lead-out portions 121b and 122b may have a trapezoid shape in a plan view and each of the body portion 121a and 122a may have a rectangular shape in a plan view. A shorter base of the trapezoid of each of the lead-out portions 121b and 122b may be exposed from the ceramic body 110 and may have a width of (w2). A longer base of the trapezoid of the lead-out portion 121b may be conterminous with a side of the rectangular shape of the body portion 121a and thus may have the same width as the width (w1) of the body portion 121a. A longer base of the trapezoid of the lead-out portion 122b may be conterminous with a side of the rectangular shape of the body portion 122a and thus may have the same width as the width (w1) of the body portion 122a. The present disclosure, however, is not limited thereto.

Conventionally, a pattern in which a width of a lead-out portion, which is a region exposed to an outside of a ceramic body, is smaller than that of a body portion contributing to capacity generation was applied to the internal electrodes in order to prevent such deterioration of moisture-resistance reliability.

However, if the width of the lead-out portion exposed to the outside of the ceramic body is much smaller than that of the body portion contributing to capacity generation in order to prevent the deterioration of moisture-resistance reliability, there are side effects of increased equivalent series resistance (ESR) and equivalent series inductance (ESL).

According to an embodiment, a multilayer ceramic electronic component capable of implementing low ESR and having excellent reliability can be obtained by adjusting a ratio of the width (w2) of the lead-out portions 121b and 122b to the width (w1) of the body portions 121a and 122a of the first and second internal electrodes 121 and 122 to satisfy $0.3 \leq w2/w1 \leq 0.5$.

In other words, according to an embodiment, the pattern in which the width of the lead-out portions 121b and 122b, which are the regions exposed to an outside of the ceramic body 110, are smaller than that of the body portions 121a and 122a contributing to capacity generation is applied to the first and second internal electrodes 121 and 122 in order to prevent the deterioration of moisture-resistance reliability; however, in order to reduce the side effects of increased ESR and ESL, which may be caused thereby, the ratio (w2/w1) of the width (w2) of the lead-out portions 121b and 122b to the width (w1) of the body portions 121a and 122a of the first and second internal electrodes 121 and 122 is adjusted.

When the ratio (w2/w1) of the width (w2) of the lead-out portions 121b and 122b to that (w1) of the body portions 121a and 122a of the first and second internal electrodes 121 and 122 is lower than 0.3, the ESR and the ESL are too high.

In contrast, the moisture resistance is reduced when the ratio (w2/w1) of the width (w2) of the lead-out portions 121b and 122b to the width (w1) of the body portions 121a and 122a of the first and second internal electrodes 121 and 122 is greater than 0.5.

In particular, when the ratio (w2/w1) of the width (w2) of the lead-out portions 121b and 122b to the width (w1) of the body portions 121a and 122a of the first and second internal electrodes 121 and 122 satisfies $0.3 \leq w2/w1 \leq 0.5$, low ESL can be increased while increasing reliability. In addition, at least two chips can be replaced with a single chip.

That is, the length and width of the multilayer ceramic electronic component are 1.0±0.1 mm and 0.5±0.1 mm (a size of 1005), respectively.

When the length and width of a conventional multilayer ceramic capacitor is in 0603 size, that is, 0.6 mm and 0.3 mm, respectively, ESL is approximately 160 pH and ESR is approximately 20 mΩ.

When the ratio (w2/w1) of the width (w2) of the lead-out portions 121b and 122b to the width (w1) of the body portions 121a and 122a of the first and second internal electrodes 121 and 122 satisfies $0.3 \leq w2/w1 \leq 0.5$, ESL can be 80 pH or less and ESR can be 10 mΩ although the length and width of the multilayer ceramic electronic component are 1.0±0.1 mm and 0.5±0.1 mm, respectively.

In other words, when the ratio (w2/w1) of the width (w2) of the lead-out portions 121b and 122b to that (w1) of the body portions 121a and 122a of the first and second internal electrodes 121 and 122 satisfies $0.3 \leq w2/w1 \leq 0.5$, the multilayer ceramic electronic component 100 according to an embodiment facilitate obtaining of electrical characteristics of replacing two multilayer ceramic capacitors in the size of 0603.

Therefore, two conventional multilayer ceramic capacitors can be replaced with one multilayer ceramic electronic component according to an embodiment, thereby reducing a substrate mounting surface area.

Referring to FIG. 5, the first and second external electrodes 131 and 132 are disposed on the fifth surface S5 and the sixth surface S6 in the width direction of the ceramic body 110, respectively, and may extend to the first surface S1 and the second surface S2 in the thickness direction of the ceramic body 110.

The first and second external electrodes 131 and 132 are disposed on external surfaces of the ceramic body 110. The first external electrode 131 may include a first electrode layer 131a including a first conductive metal and a conductive layer 131b disposed on the first electrode layer 131a and including a second conductive metal, and the second external electrode 132 may include a second electrode layer 132a including a first conductive metal and a conductive layer 132b disposed on the second electrode layer 132a and including a second conductive metal.

Referring to FIG. 5, the conductive layers 131b and 132b each include a single layer, but are not limited thereto. For example, the conductive layers may each have at least two layers.

The first electrode layers 131a and 132a may include a first conductive metal and a glass.

In order to generate capacitance, the first and second external electrodes 131 and 132 may be formed on the fifth surface S5 and the sixth surface S6 in the width direction of the ceramic body 110, respectively. The first electrode layers 131a and 132a included in the first and second external electrodes 131 and 132 may be electrically connected to the first and second internal electrodes 121 and 122, respectively.

The first electrode layers 131a and 132a may be formed with the same conductive materials as the first and second internal electrodes 121 and 122, but are not limited thereto. For example, the first electrode layers 131a and 132a may include at least one first conductive metal selected from the group consisting of copper (Cu), silver (Ag), nickel (Ni) and alloys thereof.

The first electrode layers 131a and 132a may be formed by applying a conductive paste prepared by adding glass frit to powder of the first conductive metal and firing the conductive paste.

According to an embodiment, the first and second external electrodes 131 and 132 are disposed on the first conductive layers 131a and 132a but may include the conductive layers 131a and 132b including the second conductive metal.

The second conductive metal is not particularly limited, but may be at least one selected from the group consisting of copper (Cu), nickel (Ni), tin (Sn) and alloys thereof.

Meanwhile, according to an embodiment, the multilayer ceramic capacitor 100 may have a thickness of 100 µm or less.

A demand for multilayer ceramic capacitors having a thickness of 100 µm or less has been increasing due to a recent trend that mounting density of a substrate is growing higher. However, the multilayer ceramic capacitors have low moisture resistance.

According to an embodiment, the moisture resistance can be prevented by adjusting the ratio of the width (w2) of the lead-out portions 121b and 122b to that (w1) of the body portions 121a and 122a of the first and second internal electrodes 121 and 122 to satisfy $0.3 \leq w2/w1 \leq 0.5$.

In this regard, deterioration of reliability can also be prevented even in the case where a thin cover portion is arranged in a multilayer ceramic capacitor having a thickness of 100 µm or less.

Referring to FIG. 5, a thickness ($T_c$) of the cover portions C1 and C2 may satisfy 1/40 or less with respect to a width (W) of the multilayer ceramic electronic component and 1/5 or less with respect to a thickness (T) of the multilayer ceramic electronic component.

When the thickness ($T_c$) of the cover portions C1 and C2 satisfies 1/40 or less with respect to the width (W) or 1/5 or less with respect to the thickness (T) of the conventional multilayer ceramic electronic component, reliability may deteriorate.

According to an embodiment, however, by adjusting the ratio of the width (w2) of the lead-out portions 121b and 122b to that (w1) of the body portions 121a and 122a of the first and second internal electrodes 121 and 122 to satisfy $0.3 \leq w2/w1 \leq 0.5$, the deterioration of reliability can be prevented even when the thickness ($T_c$) of the cover portions C1 and C2 satisfies 1/40 or less with respect to the width (W) and 1/5 or less with respect to the thickness (T) of the multilayer ceramic electronic component.

According to an embodiment, a miniaturized and high capacity multilayer ceramic capacitor is featured to have a thickness of the dielectric layer 111 of 0.4 µm or less and a thickness of each of the first and second internal electrodes 121 and 122 of 0.4 µm or less.

When the dielectric layer 111 is as thin as 0.4 µm or less and the internal electrodes are as thin as 0.4 µm or less as in the embodiment above, reliability may be deteriorated.

In an embodiment, however, the reliability can be improved by adjusting the ratio of the width (w2) of the lead-out portions 121b and 122b to the width (w1) of the body portions 121a and 122a of the first and second internal electrodes 121 and 122 to satisfy $0.3 \leq w2/w1 \leq 0.5$.

However, a thin film does not necessarily mean that the thicknesses of the dielectric layers 111 and the first and second internal electrodes 121 and 122 are 0.4 µm or less; it may be understood that a dielectric layer and internal electrodes thinner than conventional products are included.

Referring to FIG. 6, a surface area ratio of a sum of areas of the first and second external electrodes 131 and 132 disposed on the first surface S1 (or on the second surface S2) in the thickness direction of the ceramic body 110 to an areas of the first surface S1 (or the second surface S2) of the ceramic body 110 may be 50% or greater.

When the surface area ratio of the sum of the areas of the first and second external electrodes 131 and 132 disposed on the first surface S1 (or the second surface S2) in the thickness direction of the ceramic body 110 to the area of the first surface S1 (or the second surface S2) of the ceramic body 110 is 50% or greater, low ESL can be implemented.

Hereinbelow, a method for manufacturing a multilayer ceramic electronic component according to an embodiment will be described, but is not limited thereto.

The method for manufacturing a multilayer ceramic electronic component according to an embodiment involves preparing a plurality of ceramic green sheet by applying slurry prepared to include powder of $BaTiO_3$ or the like on a carrier film and drying, thereby forming a dielectric layer.

Manufacture of the ceramic green sheet involves preparing slurry by mixing ceramic powder, a binder and a solvent and forming the slurry in the form of a sheet having several micrometer-thick using a doctor blade method.

A conductive paste can be prepared to include nickel particles having a particle size of 0.1 µm to 0.2 µm in an amount of 40 parts by weight to 50 parts by weight.

The ceramic body 110 was prepared by applying the conductive paste for internal electrodes on the green sheet using a screen printing method to form an internal electrode pattern and stacking the green sheets in which internal electrode patterns are formed.

After firing the internal electrode patterns according to an embodiment, the internal electrode pattern was prepared so as that the ratio (w2/w1) of the width (w2) of the lead-out portions 121b and 122b to the width (w1) of the body portions 121a and 122a of the first and second internal electrodes 121 and 122 satisfies 0.3≤w2/w1≤0.5.

First electrode layer can then be prepared to include a first conductive metal and a glass on external surfaces of the ceramic body.

The first conductive metal is not particularly limited, but for example, may be at least one selected from the group consisting of Cu, Ag, Ni and alloys thereof.

The glass is not particularly limited, and a material having the same composition as the glass used in the manufacture of external electrodes of a conventional multilayer ceramic capacitor.

The first electrode layers are formed on upper and lower surfaces and an end portion of the ceramic body, and thus can be electrically connected to the first and second internal electrodes, respectively.

The first electrode layers may include at least 5 volume % of the glass account with respect to the first conductive metal.

A conductive layer may be formed to include a second conductive metal on the first electrode layer.

The second conductive metal is not particularly limited, but for example, may be at least one selected from the group consisting of Cu, Ni, Sn and alloys thereof.

According to an embodiment, a ratio (w2/w1) of the width (w2) of the lead-out portions 121b and 122b to that (w1) of the body portions 121a and 122a of the first and second internal electrodes 121 and 122 is adjusted to satisfy 0.3≤w2/w1≤0.5.

Table 1 below shows measurements of crack frequencies according to thicknesses of the cover portion at various ratios (w2/w1) of the width (w2) of the lead-out portions 121b and 122b to the width (w1) of the body portions 121a and 122a of the first and second internal electrodes 121 and 122.

TABLE 1

| Sample | w2/w1 | ESL (pH) | ESR (mΩ) | Reliability |
|---|---|---|---|---|
| *1 | 1.0 | 53.91 | 5.86 | X |
| *2 | 0.9 | 55.07 | 5.87 | X |
| *3 | 0.8 | 57.18 | 5.96 | X |
| *4 | 0.7 | 60.40 | 6.15 | X |
| *5 | 0.6 | 63.19 | 6.69 | X |
| 6 | 0.5 | 67.05 | 7.42 | ○ |
| 7 | 0.4 | 71.75 | 8.19 | ○ |
| 8 | 0.3 | 78.28 | 9.26 | ○ |
| *9 | 0.2 | 84.55 | 10.66 | ○ |
| *10 | 0.1 | 92.54 | 13.05 | ○ |

*Comparative Example

Sample Nos. 1 to 5, which are Comparative Examples, in Table 1 above are the cases in which the ratio (w2/w1) of the width (w2) of the lead-out portions 121b and 122b to the width (w1) of the body portions 121a and 122a of the first and second internal electrodes 121 and 122 is greater than 0.5, thereby giving rise to reduced moisture resistance.

Meanwhile, sample Nos. 9 and 10, which are Comparative Examples, are the cases in which the ratio (w2/w1) of the width (w2) of the lead-out portions 121b and 122b to the width (w1) of the body portions 121a and 122a of the first and second internal electrodes 121 and 122 is less than 0.3, thereby giving rise too high ESR and ESL.

In contrast, sample Nos. 6 to 8, which are the Examples of the present disclosure, are the cases in which the ratio (w2/w1) of the width (w2) of the lead-out portions 121b and 122b to the width (w1) of the body portions 121a and 122a of the first and second internal electrodes 121 and 122 is adjusted to satisfy 0.3≤w2/w1≤0.5. Accordingly, a multilayer ceramic electronic component capable of implementing low ESL and having excellent reliability can be obtained.

In particular, sample Nos. 6 to 8, which are the Examples of the present disclosure, are the cases in which the ratio (w2/w1) of the width (w2) of the lead-out portions 121b and 122b to the width (w1) of the body portions 121a and 122a of the first and second internal electrodes 121 and 122 satisfies 0.3≤w2/w1≤0.5. This facilitates low ESL implementation and improved reliability, while replacing at least two chips with a single chip.

In other words, in the case of a conventional multilayer capacitor in the size of 0603, that is, 0.6 mm long and 0.3 mm wide, ESL is approximately 160 pH and ESR is approximately 20 mΩ.

However, in the cases of sample Nos. 6 to 8, in which the ratio (w2/w1) of the width (w2) of the lead-out portions 121b and 122b to that (w1) of the body portions 121a and 122a of the first and second internal electrodes 121 and 122 satisfies 0.3≤w2/w1≤0.5, ESL can be 80 pH or less and ESR can be approximately 10 mΩ or less.

That is, when the ratio (w2/w1) of the width (w2) of the lead-out portions 121b and 122b to the width (w1) of the body portions 121a and 122a of the first and second internal electrodes 121 and 122 satisfies 0.3≤w2/w1≤0.5, the multilayer ceramic electronic component 100 according to an embodiment facilitate obtaining of electrical characteristics of replacing two multilayer ceramic capacitors in the size of 0603.

Therefore, two conventional multilayer ceramic capacitors can be replaced with one multilayer ceramic electronic component according to an embodiment, thereby reducing a substrate mounting surface area.

While example embodiments have been shown and described above, it will be apparent to those skilled in the art that modifications and variations could be made without departing from the scope of the present disclosure as defined by the appended claims.

What is claimed is:

1. A multilayer ceramic electronic component, comprising:
   a ceramic body comprising dielectric layers and first and second internal electrodes facing each other with respective dielectric layers interposed therebetween, and a first surface and a second surface opposing each other in a thickness direction of the ceramic body along which the dielectric layers are stacked, a third surface and a fourth surface connected to the first and second surfaces and opposing each other, and a fifth surface and a sixth surface connected to the first to fourth surfaces and opposing each other; and
   a first external electrode and a second external electrode disposed on the fifth and sixth surfaces of the ceramic body, respectively, the first external electrode being electrically connected to the first internal electrode and the second external electrode being electrically connected to the second internal electrode,
   wherein the ceramic body comprises an active portion generating capacitance and including the first and second internal electrodes disposed to face each other with respective dielectric layers interposed therebetween, and cover portions disposed on an upper part and a lower part of the active portion, respectively, wherein the first internal electrode comprises a body portion contributing to the capacitance generation and a lead-out portion having a narrower width than the body portion and an end exposed from the fifth surface, wherein the second internal electrode comprises a body portion contributing to the capacitance generation and a lead-out portion having a narrower width than the body portion of the second internal electrode and an end exposed from the sixth surface, wherein a ratio (w2/w1) of a width (w2) of the lead-out portion of the first and second internal electrodes to a width (w1) of the body portion satisfies $0.3 \leq w2/w1 \leq 0.5$, and wherein a thickness of the multilayer ceramic electronic component in the stacking direction is 100 μm or less.

2. The multilayer ceramic electronic component of claim 1, wherein a length and a width of the multilayer ceramic electronic component are 1.0±0.1 mm and 0.5±0.1 mm, respectively.

3. The multilayer ceramic electronic component of claim 2, wherein the length is a distance between the third and fourth surfaces, and the width is a distance between the fifth and sixth surfaces.

4. The multilayer ceramic electronic component of claim 1, wherein a ratio of a thickness of each of the cover portions with respect to a width of the multilayer ceramic electronic component satisfies 1/40 or less, and the width of the multilayer ceramic electronic component is a distance between the fifth and sixth surfaces.

5. The multilayer ceramic electronic component of claim 1, wherein a ratio of a thickness of each of the cover portions with respect to a thickness of the multilayer ceramic electronic component in the thickness direction satisfies 1/5 or less.

6. The multilayer ceramic electronic component of claim 1, wherein a length of the ceramic body is a distance between the third surface and the fourth surface and a width thereof is a distance between the fifth surface and the sixth surface, and the length is greater than the width.

7. The multilayer ceramic electronic component of claim 1, wherein the first external electrode and the second external electrode extend to the first surface and the second surface, and a surface area ratio of a sum of areas of the first and second external electrodes disposed on one of the first surface and the second surface with respect to an area of the one of the first surface and the second surface of the ceramic body is 50% or greater.

8. The multilayer ceramic electronic component of claim 1, wherein a thickness of each of the first and second internal electrodes is 0.4 μm or less.

9. The multilayer ceramic electronic component of claim 1, wherein a thickness of each of the dielectric layers is 0.4 μm or less.

10. The multilayer ceramic electronic component of claim 1, wherein the width (w2) of the lead-out portion is a width of the end portion of the lead-out portion exposed from the ceramic body.

11. The multilayer ceramic electronic component of claim 1, wherein each of the lead-out portions has a trapezoid shape.

12. The multilayer ceramic electronic component of claim 11, wherein a shorter base of the trapezoid of each of the lead-out portions is exposed from the ceramic body and has a width of (w2), and a longer base of the trapezoid of each of the lead-out portions is conterminous with a side of a respective one of the body portions and has a width of (w1).

13. A multilayer ceramic electronic component, comprising:

a ceramic body comprising dielectric layers and first and second internal electrodes facing each other with respective dielectric layers interposed therebetween, and a first surface and a second surface opposing each other in a thickness direction of the ceramic body along which the dielectric layers are stacked, a third surface and a fourth surface connected to the first and second surfaces and opposing each other, and a fifth surface and a sixth surface connected to the first to fourth surfaces and opposing each other; and a first external electrode and a second external electrode disposed on the fifth and sixth surfaces of the ceramic body, respectively, the first external electrode being electrically connected to the first internal electrode and the second external electrode being electrically connected to the second internal electrode, wherein the ceramic body comprises an active portion generating capacitance and including the first and second internal electrodes disposed to face each other with respective dielectric layers interposed therebetween, and cover portions disposed on an upper part and a lower part of the active portion, respectively, wherein the first internal electrode comprises a body portion contributing to the capacitance generation and a lead-out portion having a narrower width than the body portion and an end exposed from the fifth surface, wherein the second internal electrode comprises a body portion contributing to the capacitance generation and a lead-out portion having a narrower width than the body portion of the second internal electrode and an end exposed from the sixth surface, wherein a ratio (w2/w1) of a width (w2) of the lead-out portion of the first and second internal electrodes to a width (w1) of the body portion satisfies $0.3 \leq w2/w1 \leq 0.5$, and wherein a ratio of a thickness of each of the cover portions with respect to a thickness of the multilayer ceramic electronic component in the thickness direction satisfies 1/5 or less.

14. The multilayer ceramic electronic component of claim 13, wherein a length and a width of the multilayer ceramic electronic component are 1.0±0.1 mm and 0.5±0.1 mm, respectively.

15. The multilayer ceramic electronic component of claim 14, wherein the length is a distance between the third and fourth surfaces, and the width is a distance between the fifth and sixth surfaces.

16. The multilayer ceramic electronic component of claim 13, wherein a ratio of a thickness of each of the cover portions with respect to a width of the multilayer ceramic electronic component satisfies 1/40 or less, and the width of the multilayer ceramic electronic component is a distance between the fifth and sixth surfaces.

17. The multilayer ceramic electronic component of claim 13, wherein a thickness of the multilayer ceramic electronic component in the stacking direction is 100 μm or less.

18. The multilayer ceramic electronic component of claim 13, wherein a length of the ceramic body is a distance between the third surface and the fourth surface and a width thereof is a distance between the fifth surface and the sixth surface, and the length is greater than the width.

19. The multilayer ceramic electronic component of claim 13, wherein the first external electrode and the second external electrode extend to the first surface and the second surface, and
- a surface area ratio of a sum of areas of the first and second external electrodes disposed on one of the first surface and the second surface with respect to an area of the one of the first surface and the second surface of the ceramic body is 50% or greater.

20. The multilayer ceramic electronic component of claim 13, wherein a thickness of each of the first and second internal electrodes is 0.4 μm or less.

21. The multilayer ceramic electronic component of claim 13, wherein a thickness of each of the dielectric layers is 0.4 μm or less.

22. The multilayer ceramic electronic component of claim 13, wherein the width (w2) of the lead-out portion is a width of the end portion of the lead-out portion exposed from the ceramic body.

23. The multilayer ceramic electronic component of claim 13, wherein each of the lead-out portions has a trapezoid shape.

24. The multilayer ceramic electronic component of claim 23, wherein a shorter base of the trapezoid of each of the lead-out portions is exposed from the ceramic body and has a width of (w2), and a longer base of the trapezoid of each of the lead-out portions is conterminous with a side of a respective one of the body portions and has a width of (w1).

\* \* \* \* \*